(12) United States Patent
Amiri et al.

(10) Patent No.: US 8,059,761 B2
(45) Date of Patent: Nov. 15, 2011

(54) DETECTING IN-PHASE AND QUADRATURE-PHASE AMPLITUDES OF MIMO COMMUNICATIONS

(75) Inventors: Kiarash Amiri, Houston, TX (US); Christopher H. Dick, San Jose, CA (US); Raghavendar Mysore Rao, Austin, TX (US); Joseph R. Cavallaro, Pearland, TX (US)

(73) Assignee: Xilinx, Inc., San Jose, CA (US)

( * ) Notice: Subject to any disclaimer, the term of this patent is extended or adjusted under 35 U.S.C. 154(b) by 715 days.

(21) Appl. No.: 12/170,474

(22) Filed: Jul. 10, 2008

(65) Prior Publication Data

US 2010/0007565 A1 Jan. 14, 2010

(51) Int. Cl.
*H04L 27/06* (2006.01)

(52) U.S. Cl. ...................................................... 375/340

(58) Field of Classification Search .......... 375/259–260, 375/267, 299, 316, 340, 347, 349, 295
See application file for complete search history.

(56) References Cited

U.S. PATENT DOCUMENTS

| | | | |
|---|---|---|---|
| 7,245,666 B1 | 7/2007 | Gardner et al. | |
| 7,529,307 B2* | 5/2009 | Sandhu et al. | 375/260 |
| 7,720,169 B2* | 5/2010 | Reuven et al. | 375/267 |
| 2006/0148506 A1 | 7/2006 | Hoo | |
| 2006/0171483 A1 | 8/2006 | Jia et al. | |
| 2007/0162827 A1 | 7/2007 | Walton et al. | |
| 2008/0089446 A1 | 4/2008 | Lee et al. | |
| 2008/0095281 A1 | 4/2008 | Hosur et al. | |
| 2008/0107196 A1* | 5/2008 | Won | 375/260 |
| 2008/0144746 A1 | 6/2008 | Waters et al. | |
| 2008/0279298 A1 | 11/2008 | Ben-Yishai et al. | |
| 2008/0279299 A1 | 11/2008 | Reuven et al. | |
| 2009/0003499 A1 | 1/2009 | Chiu et al. | |

(Continued)

FOREIGN PATENT DOCUMENTS

WO  WO 2008/027554 A3  3/2008

OTHER PUBLICATIONS

Chin, W. H., "QRD Based Tree Search Data Detection for MIMO Communication System," *Proc. of the IEEE 61st Semiannual Vehicular Technology Conference*, May 30-Jun. 1, 2005, pp. 1624-1627, vol. 3, Stockholm, Sweden.

(Continued)

*Primary Examiner* — Jean B Corrielus
(74) *Attorney, Agent, or Firm* — LeRoy D. Maunu

(57) ABSTRACT

Circuits detect communications from multiple transmitting antennas to multiple receiving antennas. A respective first block for each non-initial transmitting antenna determines partial distances for pairings of a first candidate and a quadrature-phase amplitude. A respective second block for the initial transmitting antenna determines partial distances for combinations of phase amplitudes. A respective second block for each non-initial transmitting antenna determines partial distances for pairings of a second candidate and an in-phase amplitude. A respective first selector for each non-initial transmitting antenna selects the first candidates from the pairings for the respective second block having smaller partial distances. A respective second selector for each non-initial transmitting antenna selects the second candidates from the pairings for the respective first block having smaller partial distances. An identifier circuit selects a final candidate with a smaller partial distance from the pairings of the respective second block for the last transmitting antenna.

19 Claims, 6 Drawing Sheets

U.S. PATENT DOCUMENTS

| | | |
|---|---|---|
| 2009/0060079 A1 | 3/2009 | Choi et al. |
| 2009/0154600 A1 | 6/2009 | Kim et al. |
| 2009/0196379 A1 | 8/2009 | Gan et al. |

OTHER PUBLICATIONS

Detert, Thorben, "An Efficient Fixed Complexity QRD-M Algorithm for MIMO-OFDM using Per-Survivor Slicing," *Proc. of the 4th IEEE Int'l. Symposium on Wireless Communication Systems*, Oct. 16-19, 2007, pp. 572-576, Trondheim, Norway.

Amiri, Kiarash et al., "Novel Sort-Free Detector with Modified Real-Valued Decomposition (M-RVD) Ordering in MIMO Systems," *Proc. of the 2008 IEEE Global Telecommunications Conference*, Nov. 30, 2008, pp. 1-5, Piscataway, New Jersey, USA.

Azzam, Luay et al., "Reduced Complexity Sphere Decoding for Square QAM via a New Lattice Representation," *Proc. of the 2007 IEEE Global Telecommunications Conference*, Nov. 1, 2007, pp. 4242-4246, Piscataway, New Jersey, USA.

Azzam, Luay et al., "Reduction of ML Decoding Complexity for MIMO Sphere Decoding, QOSTBC, and OSTBC," *Proc. of the 2008 Information Theory and Applications Workshop*, Jan. 27, 2008, pp. 18-25, Piscataway, New Jersey, USA.

Chen, Sizhong et al., "Relaxed K-Best MIMO Signal Detector Design and VLSI Implementation," *IEEE Transactions on Very Large Scale Integration (VLSI) Systems*, Mar. 2007, pp. 328-337, vol. 15, No. 3.

Kawai, Hiroyuki et al., "Independent Adaptive Control of Surviving Symbol Replica Candidates at Each Stage Based on Minimum Branch Metric in QRM-MLD for OFCDM MIMO Multiplexing," *Proc. of the 2004 IEEE 60th Vehicular Technology Conference*, Sep. 26, 2004, pp. 1558-1564, vol. 3, Piscataway, New Jersey, USA.

Lin, Hsin-Lei et al., "A High-Speed SDM-MIMO Decoder Using Efficient Candidate Searching for Wireless Communication," *IEEE Transactions on Circuits and Systems—II: Express Briefs*, Mar. 2008, pp. 289-293, vol. 55, No. 3.

Mondal, Sudip, "A Novel Approach for K-Best MIMO Detection and its VLSI Implementation," *Proc. of the 2008 IEEE International Symposium on Circuits and Systems*, May 18, 2008, pp. 936-939, Piscataway, New Jersey, USA.

Myllylä, Markus et al., "Implementation Aspects of List Sphere Detector Algorithms," *Proc. of the 2007 IEEE Global Telecommunications Conference*, Nov. 1, 2007, pp. 3915-3920, Piscataway, New Jersey, USA.

Myllylä, Markus et al., "A List Sphere Detector Based on Dijkstra's Algorithm for MIMO-OFDM Systems," *Proc. of the 2007 IEEE 18th Annual Symposium on Personal, Indoor and Mobile Radio Communications*, Sep. 1, 2007, pp. 1-5, Piscataway, New Jersey, USA.

Wu, Yi Hsuan, "Early-Pruned K-Best Sphere Decoding Algorithm Based on Radius Constrains," *Proc. of the 2008 IEEE International Conference on Communications*, May 19, 2008, pp. 4496-4500, Piscataway, New Jersey, USA.

Huang, Liang et al.; "Better k-best Parsing"; Proceedings of the Ninth International Workshop on Parsing Technologies (IWPT); Oct. 2005; Copyright 2005 Association for Computational Linguistic; pp. 53-64.

Guo, Zhan et al.; "A Low Complexity Soft-Output MIMO Decoding Algorithm"; Advances in Wired and Wireless Communication; IEEE/Sarnoff Symposium; 2005 IEEE; pp. 90-93.

Wong, Kwan-wei et al.; "A VLSI Architecture of a K-Best Lattice Decoding Algorithm for MIMO Channels"; Circuits and Systems; 2002; ISCA 2002; IEEE International Symposium; Copyright 2002 IEEE; pp. III-273-III-276.

Damen, Mohamed Oussama et al.; "On Maximum-Likelihood Detection and the Search for the closest Lattice Point"; IEEE Transactions on Information Theory; vol. 49, No. 10; Oct. 2003; pp. 2389-2402.

Burg, Andreas et al.; "VLSI Implementation of MIMO Detection Using the Sphere Decoding Algorithm"; IEEE Journal of Solid-State Circuits; vol. 40, No. 7; Jul. 2005; Copyright 2005 IEEE; pp. 1566-1577.

Amiri, Kiarash et al.; "FPGA Implementation of Dynamic Threshold Sphere Detection for MIMO Systems"; 40th Asilomar Conference on Signals, Systems, and Computers; Nov. 2006; pp. 94-98.

Guo, Zhan et al.; A 53.3 Mb/s 4X4 16-QAM MIMO Decoder in 0.35-µm CMOS; IEEE International Symposium on Circuits and Systems; vol. 5; Copyright 2005 IEEE; May 2005; pp. 4947-4950.

Bengough, Peter A. et al.; "Sorting-Based VLSI Architectures for the M-Algorithm and T-Algorithm Trellis Decoders"; Copyright 1995 IEEE; IEEE Transactions on Communications, vol. 43, No. 2/3/4, Feb. / Mar. / Apr. 1995; pp. 514-522.

Xilinx, Inc.; U.S. Appl. No. 12/170,468; by Kiarash Amiri et al.; filed on Jul. 10, 2008.

Xilinx, Inc.; U.S. Appl. No. 12/045,786; by Kiarash Amiri et al.; filed on Mar. 11, 2008.

Xilinx, Inc.; U.S. Appl. No. 12/025,971; by Kiarash Amiri et al.; filed on Feb. 5, 2008.

Xilinx, Inc.; U.S. Appl. No. 12/193,106; by Christopher H. Dick et al.; filed on Aug. 18, 2008.

* cited by examiner

DETECTING IN-PHASE AND QUADRATURE-PHASE AMPLITUDES OF MIMO COMMUNICATIONS

FIELD OF THE INVENTION

The present invention generally relates to a communication system employing multiple transmit and multiple receive antennas in a spatial multiplexing MIMO configuration, and more particularly to symbol detection for multiple receive and transmit antennas.

BACKGROUND

Data can be transmitted electromagnetically between a transmitting and a receiving antenna. The transmitter encodes the data into a sequence of symbols selected from a signal constellation. The transmitting antenna transmits the symbols and the receiving antenna detects the symbols.

Interference from noise and reflections corrupts the symbols received by the receiving antenna. For a maximum-likelihood detector, the receiver can compare the received signal with the expected received signal for all of the symbols in the constellation. The expected received signal that most closely matches the actually received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication increases by transmitting multiple symbols in parallel from multiple transmitting antennas. The detection of the multiple transmitted symbols improves by receiving the symbols with multiple receiving antennas.

For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulations and a large number of antennas.

The present invention may address one or more of the above issues.

SUMMARY

Various embodiments of the invention provide a circuit for detecting communications from multiple transmitting antennas to multiple receiving antennas. An ordering of the transmitting antennas begins with an initial transmitting antenna and ends with a last transmitting antenna. The circuit includes a respective first block corresponding to each non-initial transmitting antenna. The respective first block determines partial distances for pairings of a first candidate and a quadrature phase amplitude of the constellation. The circuit includes a respective second block corresponding to each transmitting antenna. The respective second block for the initial transmitting antenna determines partial distances for pairings of a null candidate and combinations of a quadrature-phase and in-phase amplitudes of the constellation. The respective second block for each non-initial transmitting antenna determines partial distances for pairings of a second candidate and an in-phase amplitude of the constellation.

The circuit also includes a respective first selector corresponding to each non-initial transmitting antenna. The respective first selector is coupled between the respective second block for a preceding transmitting antenna in the ordering and the respective first block for the non-initial transmitting antenna. The respective first selector selects the first candidates for the respective first block from the pairings for the respective second block that have the smaller partial distances. The circuit includes a respective second selector corresponding to each non-initial transmitting antenna. The respective second selector is coupled between the respective first and the respective second blocks for the non-initial transmitting antenna. The respective second selector selects the second candidates for the respective second block from the pairings for the respective first block that have the smaller partial distances.

An identifier circuit is coupled to the respective second block for the last transmitting antenna. The identifier circuit selects a final candidate from the pairings of the respective second block for the last transmitting antenna, and the final candidate is one of the pairings having the smaller partial distance.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
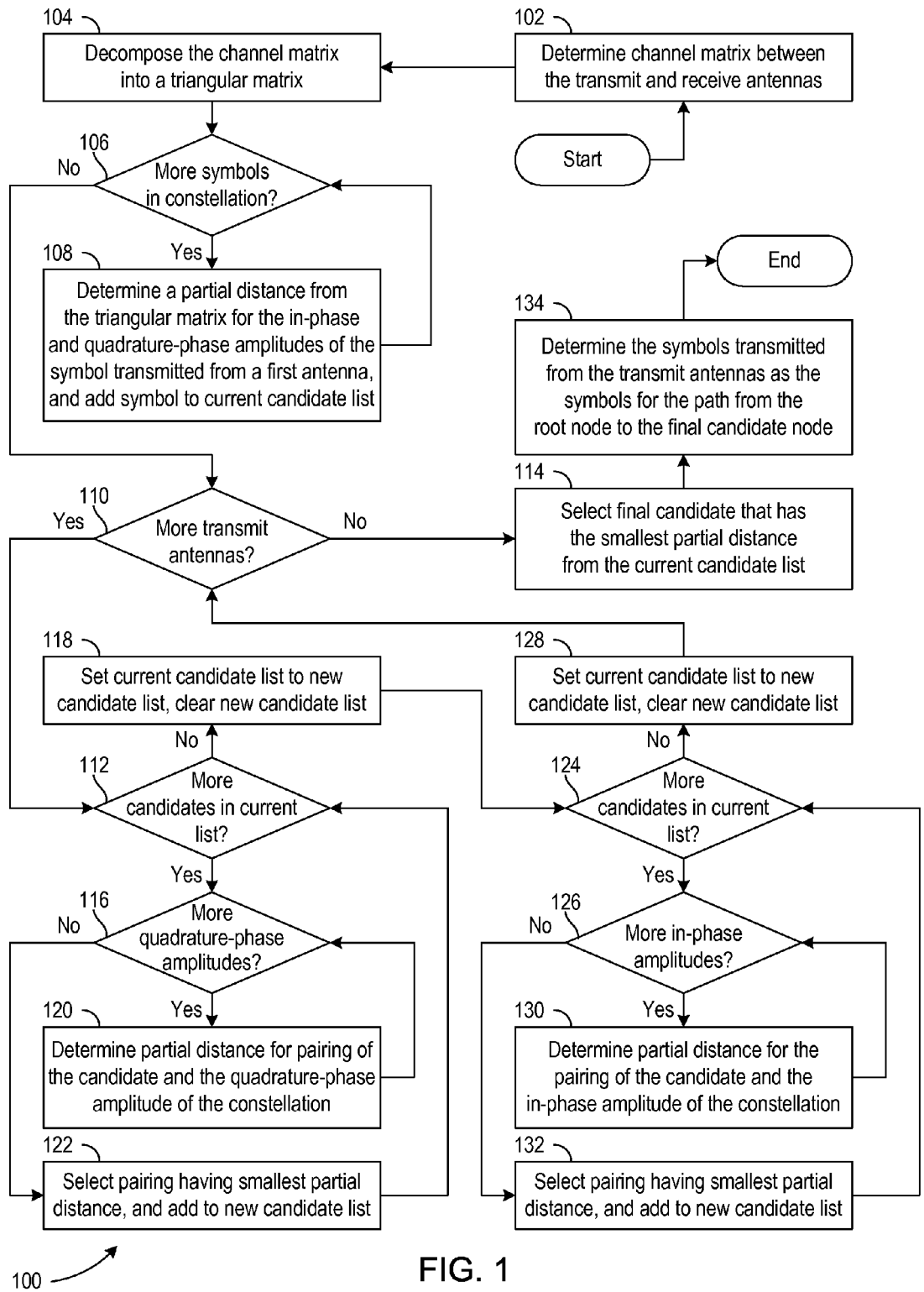
FIG. 1 is a flow diagram of a process for detecting communications between multiple transmitting antennas and multiple receiving antennas in accordance with various embodiments of the invention.

FIG. 1 is a flow diagram of a process 100 for detecting communications between multiple transmitting antennas and multiple receiving antennas in accordance with various embodiments of the invention. While a maximum-likelihood detector detects the transmitted symbols by considering all combinations of each transmitting antenna transmitting every possible symbol in a constellation, process 100 considers a subset of all of these combinations. Process 100 separates each symbol of a quadrature amplitude modulation (QAM) constellation into an in-phase component of the symbol and a quadrature-phase component of the symbol. Process 100 separately considers the in-phase and the quadrature-phase components of each symbol.

At step 102, a channel matrix is determined for the communication channel between the transmitting and receiving antennas. A model for the communication channel is:

$$x = Gr + m \qquad \text{a.}$$

where G is an N×M channel matrix between the N receiving antennas and the M transmitting antennas, r is a column vector of M symbols transmitted from the transmitting antennas, m is a column vector of N received noise elements, and x is a column vector of N signals received at the receiving antennas. Each of the M transmitted symbols in column vector r is a symbol from a constellation having an order of w symbols.

The elements in the array G and the elements in the vectors $x = [x1, x2, \ldots, xN]^T$, $r = [r1, r2, \ldots, rM]^T$, and m are complex valued elements. The equation $x = Gr + m$ can be separated into equations for the complex and real parts to produce the equivalent formulation:

$$y = Hs + n \qquad \text{b.}$$

where H is an 2N×2M real-valued channel matrix between the N receiving antennas and the M transmitting antennas, $s = [\Re(r1), \Im(r1), \Re(r2), \Im(r2), \ldots, \Re(rM), \Im(rM),]^T$ is a column vector including 2M real-valued elements for the in-phase and quadrature-phase amplitudes of the M symbols transmitted from the transmitting antennas, n is a column vector including 2N real-valued elements for the in-phase and quadrature-phase amplitudes of the noise received at the N receiving antennas, and $y = [\Re(x1), \Im(x1), \Re(x2), \Im(x2), \ldots, \Re(xN), \Im(xN),]^T$ is a column vector including 2N real-valued elements for the in-phase and quadrature phase amplitudes of the signals received at the N receiving antennas.

At step 104, process 100 decomposes the real-valued channel matrix H into a triangular matrix. In one embodiment, the triangular matrix is an upper triangular matrix from a QR decomposition of the channel matrix. The detection of the transmitted symbols includes determining the 2M in-phase and quadrature-phase symbol amplitudes in column vector s that minimize the distance norm:

$$\text{c.} \quad D(s) = \|y - Hs\|^2 = \|Q^H y - Rs\|^2 = \sum_{i=2M}^{1} \left| y'_i - \sum_{j=i}^{2M} R_{ij} s_j \right|^2$$

where $H = QR$, $QQ^H = I$, and $y' = Q^H y$ is a transformation of the in-phase and quadrature phase amplitudes of the received signals. The summations derive from R being an upper triangular matrix. The outer summation from i=2M down to 1 is a summation of a corresponding term for each in-phase and quadrature-phase component for each of the transmitting antennas beginning from the last antenna. The corresponding term of the outer summation for each phase component of each transmitting antenna is denoted the partial distance for the phase component and the transmitting antenna. The partial distance for a particular phase component with index i for a particular transmitting antenna includes an inner summation of a weighting of the phase components from i to 2M. Thus, the QR decomposition permits calculating the distance norm D(s) for the phase components s of candidate symbols by summing a partial distance for each phase component, and the partial distance for each phase component is a function of the phase components having the same and larger indices.

The receiver detects the transmitted symbols by computing the distance norm D(s) for combinations of the in-phase and quadrature-phase amplitudes of the M symbols in the constellation. The M symbols actually transmitted from the M transmitting antennas should match the combination that has the smallest value of the distance norm.

In one embodiment, higher communication bandwidth is achieved by separating a data stream into M data stripes and transmitting each data stripe from a respective antenna. In this embodiment, the transmitting antennas can be positioned in close proximity on a transmitting device. In another embodiment, the communications are multiple separate data streams with each data stream transmitted from one or more of the transmitting antennas. In this embodiment, the transmitting antennas can be positioned together on one transmitting device, positioned at a distance from each other on separate transmitting devices, or some positioned together and others positioned apart. Usually, all transmitting antennas should transmit symbols from the same constellation.

Decision 106 checks whether the constellation includes additional symbols that could be the symbol transmitted by an initial transmitting antenna in an ordering of the transmitting antennas. If there is another symbol in the constellation, process 100 proceeds to step 108; otherwise, process 100 proceeds to decision 110 to process the other non-initial transmitting antennas.

At step 108, a partial distance is determined for the pairing of an initial null candidate with the current symbol in the constellation. The partial distance specifies a likelihood that the initial transmitting antenna actually transmitted the current symbol. In one embodiment, the partial distance is determined in two steps. First, the partial distance of the quadrature-phase amplitude of the current symbol is calculated from the triangular matrix and the transformed phase amplitudes of the signals received at the receiving antennas. Second, the partial distance of the in-phase amplitude of the current symbol is calculated from the triangular matrix and the transformed phase amplitudes of the received signal. The sum of these calculated partial distances is the partial distance for the pairing of the null candidate with the current symbol. This pairing is added to a list of current candidates.

Decision 110 checks whether there are additional transmitting antennas to consider. If there are additional transmitting antennas, process 100 proceeds to decision 112; otherwise process 100 proceeds to step 114.

Decision 112 checks whether there are more candidates in the list of current candidates. If there are more candidates, process 100 proceeds to decision 116; otherwise, process 100 proceeds to step 118. Decision 116 checks whether there are more quadrature-phase amplitudes of the symbols in the constellation. If there are more quadrature-phase amplitudes, process 100 proceeds to step 120; otherwise, process 100 proceeds to step 122.

In one example, the 16-QAM constellation has four in-phase amplitudes of −3, −1, 1, and 3, along with similar quadrature-phase amplitudes. There is a symbol in the 16-QAM constellation for every combination of the four in-phase amplitudes and the four quadrature-phase amplitudes. Decision 116 iterates step 120 for each of the four possible quadrature-phase amplitudes.

At step 120, a partial distance is determined for the pairing of the current candidate and the current quadrature-phase amplitude. The partial distance specifies a likelihood that the current transmitting antenna actually transmitted a symbol that has the current quadrature-phase amplitude, while presuming the appropriate antennas transmitted the symbols specified within the current candidate. The partial distance is a sum of the partial distance of the current candidate and a partial distance for the current quadrature-phase amplitude. The partial distance of the current quadrature-phase amplitude is calculated from the phase amplitudes of the signals received at the receiving antennas, the triangular decomposition of the channel matrix, and the phase amplitudes of the symbols specified within the current candidate.

At step 122, process 100 selects a new candidate from the pairings evaluated at step 120. The new candidate is the pairing having a smaller or the smallest partial distance. The selected new candidate is added to a list of new candidates. Thus, for each candidate in the list of current candidates, a new candidate is selected and added to the list of new candidates. At step 118, the new candidate list has the same number of candidates as were in the current candidate list, and the new candidate list now becomes the current candidate list. The new candidate list is cleared to prepare for processing the in-phase amplitudes.

Decision 124 checks whether there are more candidates in the updated list of current candidates. If there are more candidates, process 100 proceeds to decision 126; otherwise, process 100 proceeds to step 128. Decision 126 checks whether there are more in-phase amplitudes of the symbols in the constellation. If there are more in-phase amplitudes, process 100 proceeds to step 130; otherwise, process 100 proceeds to step 132.

In one example, such as the 16-QAM constellation, the constellation includes a symbol for every combination of the possible in-phase and quadrature-phase amplitudes. Consequently, decision 126 iterates step 130 for each of the possible in-phase amplitudes of the symbols in the constellation. In another example, the constellation does not include corresponding symbols for certain combinations of the in-phase and quadrature-phase amplitudes, and decision 126 iterates step 130 only for the appropriate in-phase amplitudes of the current candidate. If the current candidate is a pairing having an quadrature-phase amplitude for which the constellation includes corresponding symbols for only a subset of the possible in-phase amplitudes, then decision 126 iterates step 130 for the in-phase amplitudes in the subset.

At step 130, a partial distance is determined for the pairing of the current candidate and the current in-phase amplitude. The partial distance is a sum of the partial distance of the current candidate and a partial distance for the current in-phase amplitude.

At step 132, a new candidate is selected from the pairings of the current candidate and the possible in-phase amplitudes. The selected candidate is the pairing having a smaller or smallest partial distance. The selected new candidate is added to the list of new candidates. At step 128, the new candidate list becomes the current candidate list.

At step 114, a final candidate is selected. In one embodiment, the final candidate is a candidate in the current candidate list having the smallest partial distance. At step 134, the symbols are detected that should match the symbols actually transmitted from the transmitting antennas. The final candidate provides the detected symbols as the symbols recursively included within the final candidate. In one embodiment, process 100 creates a corresponding search tree and the detected symbols are determined from the in-phase and quadrature-phase amplitudes along the path from the root node of the search tree to the node for the final candidate.

Figure 2:
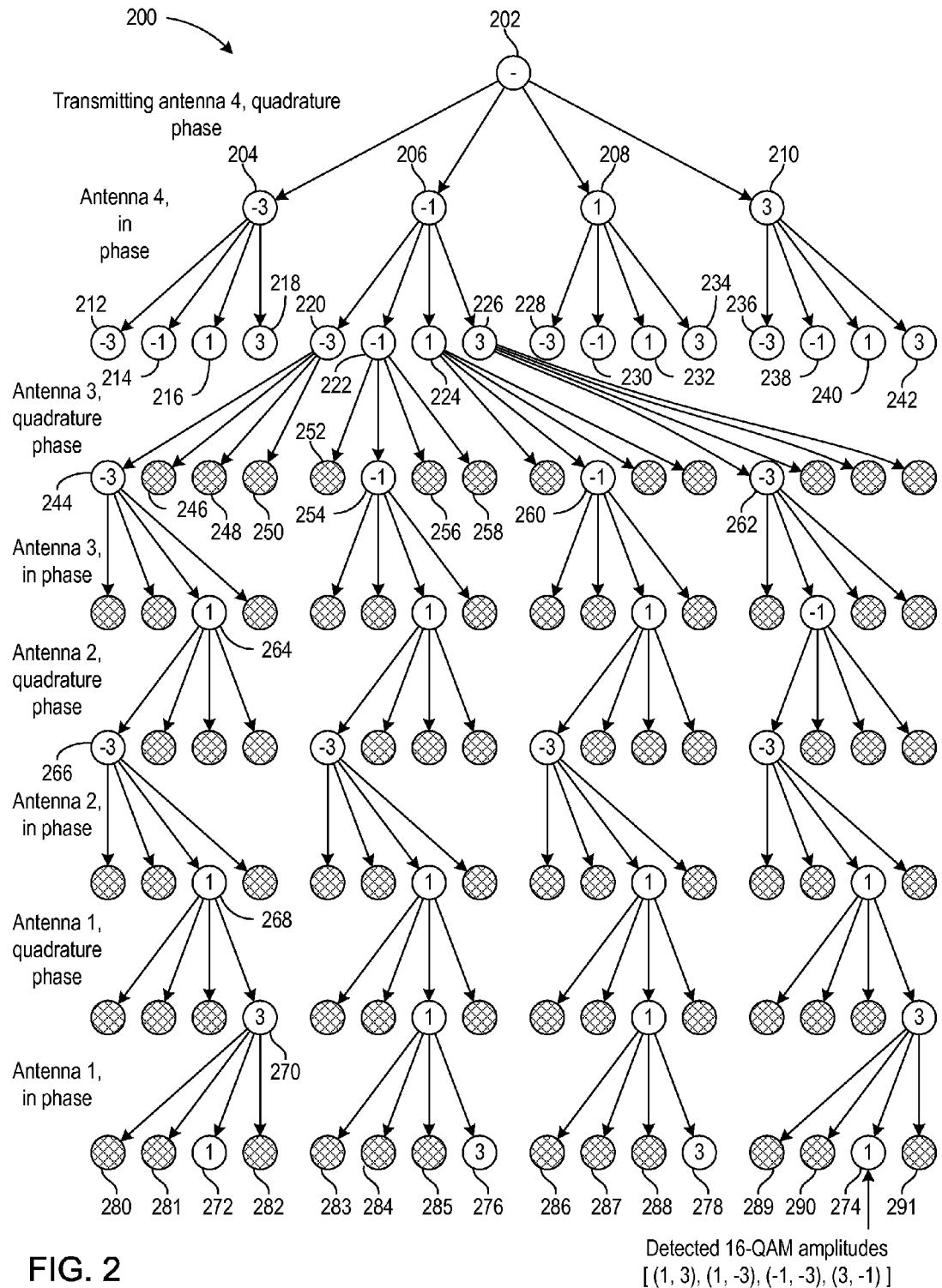
FIG. 2 is a graph diagram of an example tree illustrating a process of selecting candidates and a final candidate in accordance with various embodiments of the invention.

FIG. 2 is a graph diagram of an example tree 200 illustrating a process of selecting candidates and a final candidate in accordance with various embodiments of the invention. The example tree 200 includes nodes for the candidates and pairings considered during detection of symbols transmitted from four transmitting antennas. The example 16-QAM constellation includes a symbol for each combination of one of the in-phase amplitudes of −3, −1, 1, and 3 and one of the quadrature-phase amplitudes of −3, −1, 1, and 3. The nodes of the example tree 200, except for the root node 202, are either labeled with a phase amplitude value or are shown shaded for pairing nodes that are not selected to be candidate nodes.

The initial transmitting antenna four could transmit a symbol having one of the four possible quadrature-phase amplitudes. Nodes 204, 206, 208, and 210 correspond to the possible quadrature-phase amplitudes of the symbols in the example 16-QAM constellation. A partial distance is calculated for each of nodes 204, 206, 208, and 210. Relatively smaller values of the partial distance indicate a higher likelihood that the initial transmitting antenna actually transmitted a symbol having this quadrature-phase amplitude.

Each node 204, 206, 208, or 210 is expanded to create the nodes 212 through 242. For example, node 204 is expanded to generate nodes 212, 214, 216, and 218 for the four possible in-phase amplitudes of the symbols that could be transmitted by the initial transmitting antenna. Thus, the sixteen nodes 212 through 242 correspond to the sixteen symbols in the example 16-QAM constellation, with each of nodes 212 through 242 representing the initial transmitting antenna transmitting the corresponding symbol. For example, node 218 corresponds to the initial transmitting antenna transmitting the symbol having the quadrature-phase amplitude of −3 and the in-phase amplitude of 3, and node 218 also corresponds to a pairing of the root node 202 with this symbol in the example 16-QAM constellation.

FIG. 2 shows expansion of the quadrature-phase amplitude before the in-phase amplitude for each antenna. It will be appreciated that the quadrature-phase amplitude could be expanded before the in-phase amplitude. For example, the quadrature-phase before in-phase for a symbol constellation as shown in FIG. 2 corresponds to an in-phase before quadrature-phase for the conjugate symbol constellation obtained by exchanging the in-phase and quadrature-phase amplitudes. Thus, the in-phase and quadrature-phase amplitudes are interchangeable. It will also be appreciated that other coordinate transformations, such as a rotation, can produce other phase amplitudes.

A partial distance is calculated for each of nodes 212 through 242. The partial distance adds a partial distance calculated for the in-phase amplitude to a partial distance of the appropriate one of nodes 204, 206, 208, and 210.

It will be appreciated that nodes 204, 206, 208, and 210 are not fully expanded for certain constellations. In a contrived example, a 15-QAM constellation could be the example 16-QAM constellation with one symbol removed, and the expansion of node 204 might not include node 218.

The candidates 212 through 242 are expanded for the next transmitting antenna. For example, candidate 220 is expanded to generate nodes 244, 246, 248, and 250 for the four possible quadrature-phase amplitudes of the symbols transmitted by transmitting antenna three. FIG. 2 also shows the expansion of nodes 222, 224, and 226. For clarity, the similar expansions of nodes 212, 214, 216, 218, 228, 230, 232, 234, 236, 238, 240, and 242 are omitted from FIG. 2.

Node 244 corresponds to antenna three transmitting one of the symbols with the quadrature-phase amplitude of −3, and antenna four transmitting the symbol with quadrature-phase amplitude −1 and in-phase amplitude −3.

Partial distances are calculated for nodes 244, 246, 248, and 250, and node 244 with the smallest partial distance is selected as a candidate for further expansion. Among the nodes 252, 254, 256, and 258 expanded from node 222, node 254 similarly has the smallest partial distance, and nodes 260 and 262 are similarly selected from the expansion of nodes 224 and 226, respectively, Similar candidate nodes (not shown) are selected from the expansion of nodes 212, 214, 216, 218, 228, 230, 232, 234, 236, 238, 240, and 242. Generally, each candidate is expanded into a set of pairing nodes, and a new candidate node is selected from the set of pairing nodes. Thus, node 264 is selected from the expansion of node 244, node 266 is selected from the expansion of node 264, node 268 is selected from the expansion of node 266, node 270 is selected from the expansion of node 268, and node 272 is selected from the expansion of node 270.

In one embodiment, a final candidate node 274 is the one of the sixteen last candidates (including candidates 272, 276, 278, and 274) having a smallest partial distance. In another embodiment, candidates are not determined for the in-phase amplitudes of antenna one, and instead the final candidate node 264 is directly selected from the 64 pairing nodes that include 280, 281, 272, 282, 283, 284, 285, 276, 286, 287, 288, 278, 289, 290, 274, and 291. The final candidate node 274 is the one of the pairing nodes having the smallest partial distance.

The path from the root node 202 to the final candidate node 274 determines the symbols detected as transmitted from the transmitting antennas. Each arc of the path from the root node 202 to the final candidate node 264 corresponds to one of the phase amplitudes of one of the transmitting antennas. The symbol corresponding to the phase amplitudes for each transmitting antenna gives the detected symbol for the transmitting antenna.

Figure 3:
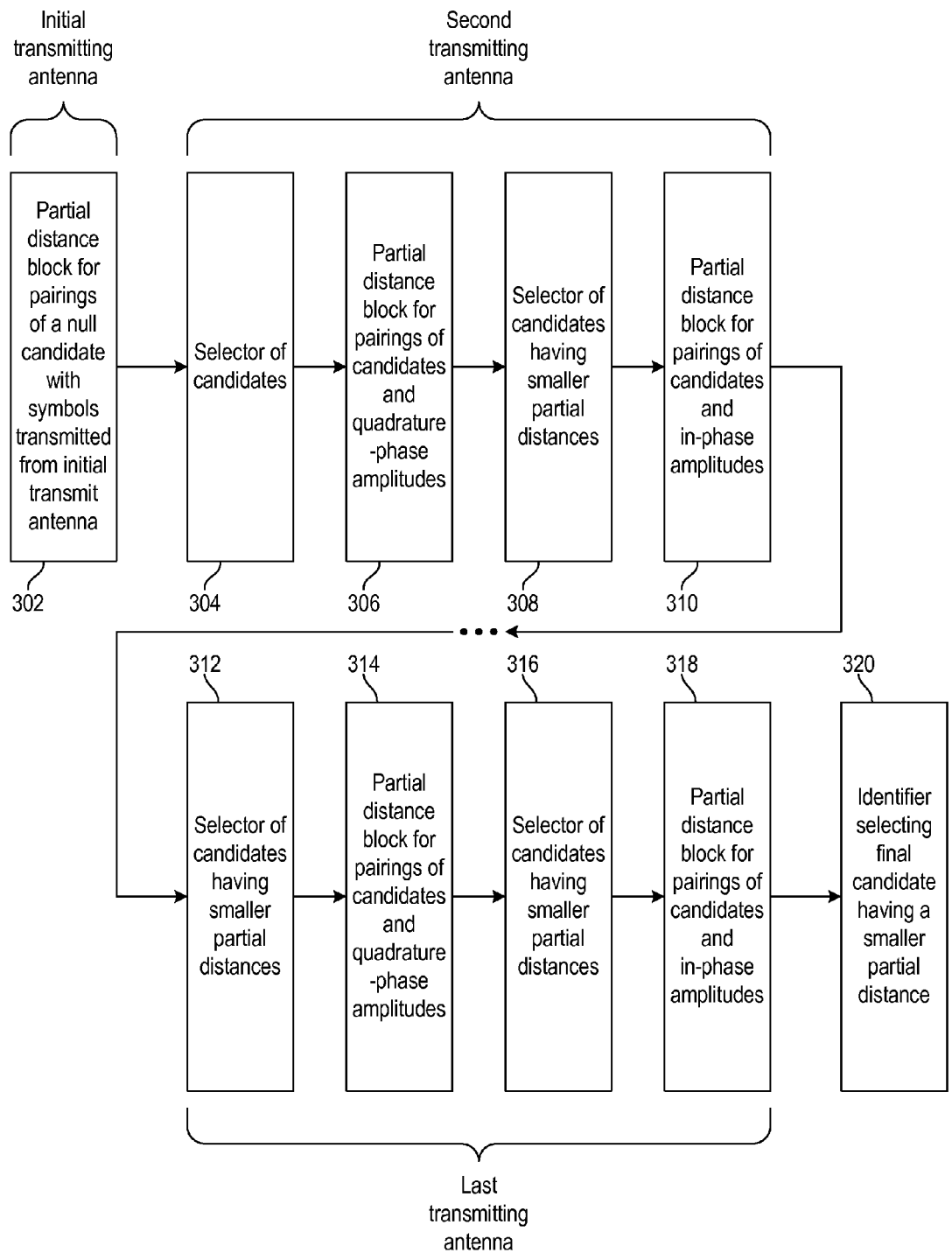
FIG. 3 is a block diagram of a circuit for detecting communications between multiple transmitting antennas and multiple receiving antennas in accordance with various embodiments of the invention.

FIG. 3 is a block diagram of a circuit for detecting communications between multiple transmitting antennas and multiple receiving antennas in accordance with various embodiments of the invention. For each of the transmitting antennas, the circuit includes a respective subcircuit associated with the transmitting antenna. The respective subcircuit associated with each transmitting antenna determines helps determine the symbol that was transmitted from the transmitting antenna.

Block 302 is associated with an initial transmitting antenna in an ordering of the transmitting antennas. Block 302 determines a partial distance for an initial transmitting antenna transmitting each of the symbols in the constellation. Each partial distance corresponds to a pairing of a null candidate with a respective symbol in the constellation.

Blocks 304, 306, 308, and 310 are associated with a second transmitting antenna in the ordering of the transmitting antennas. Block 304 selects all the candidates from block 302. In another embodiment, block 304 selects candidates that are the pairings from block 302 having smaller values of the partial distances. Block 306 determines partial distances for each pairing of a candidate from block 304 and one of the possible quadrature-phase amplitudes of the symbols in the constellation. Block 308 selects candidates that are the pairings from block 306 having smaller values of the partial distances. Block 310 determines partial distances for each pairing of a candidate from block 308 and one of the possible in-phase amplitudes of the symbols in the constellation. Blocks 312, 314, 316, and 318 are associated with a last transmitting antenna in the ordering of the transmitting antennas. Blocks 312, 314, 316, and 318 similarly determine partial distances for pairings of candidates and phase amplitudes and select candidates from the pairings.

Identifier circuit 320 selects a final candidate from the pairings generated by block 318. The final candidate is a pairing having a smaller partial distance. The final candidate specifies the symbols detected as transmitted from the transmitting antennas.

Figure 4:
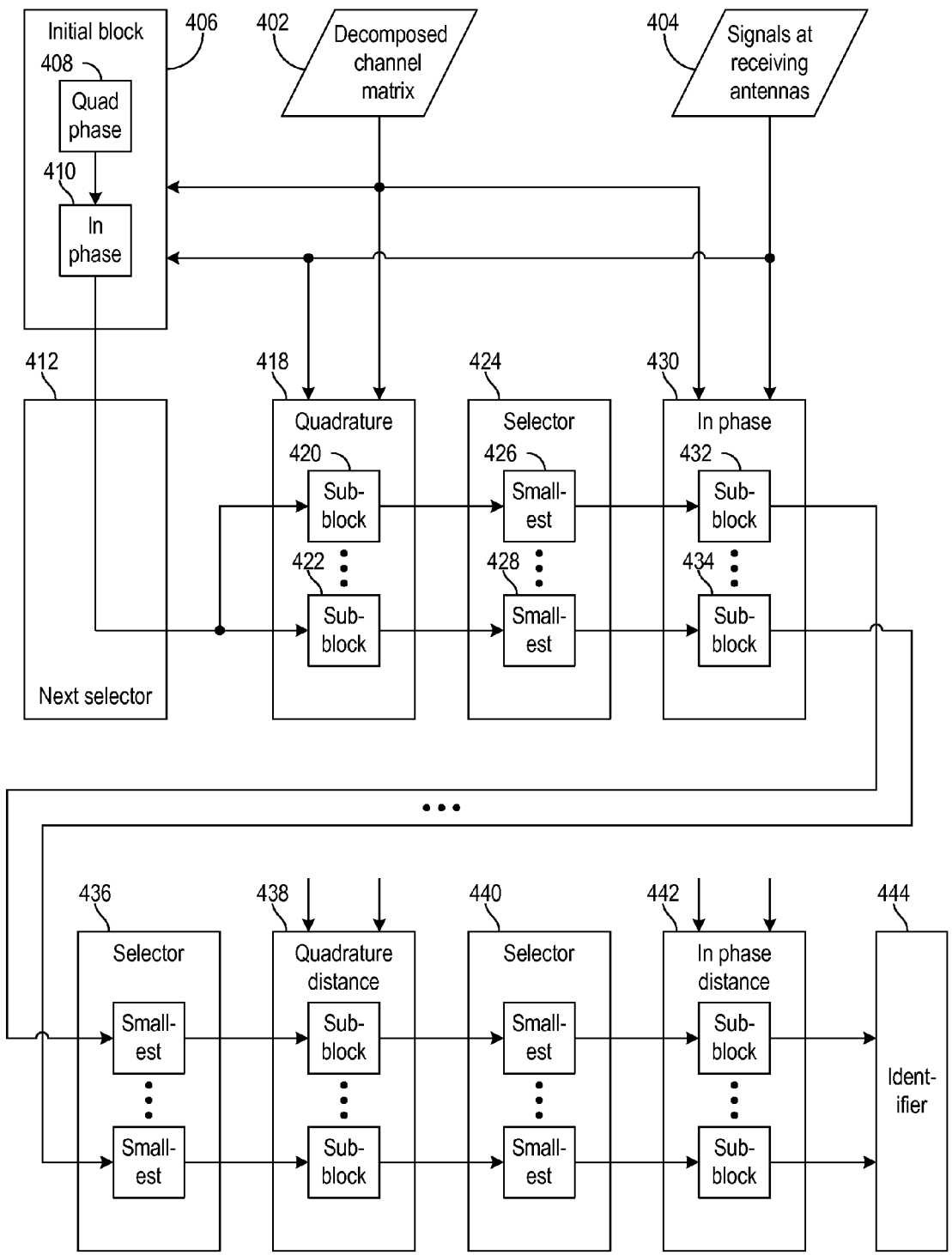
FIG. 4 is a block diagram of another circuit for detecting communications between multiple transmitting antennas and multiple receiving antennas in accordance with various embodiments of the invention.

FIG. 4 is a block diagram of another circuit for detecting communications between multiple transmitting antennas and multiple receiving antennas in accordance with various embodiments of the invention. The detected symbols are generated from the decomposed channel matrix 402 and the signals 404 received at the receiving antennas.

An initial block 406 generates respective partial distances for pairings of a null candidate and the symbols in the constellation. Each partial distance provides a likelihood that an initial transmitting antenna transmitted the corresponding symbol. A quadrature-phase block 408 generates a quadrature-phase component of the partial distances for the possible quadrature-phase amplitudes of the symbols in the constellation. An in-phase block 410 generates an in-phase component of the partial distances for the possible in-phase amplitudes of the symbols in the constellation. Blocks 408 and 410 determine the partial distances from the decomposed channel matrix 402 and the signals 404 received at the receiving antennas.

A selector 412 corresponds to a next transmitting antenna after the initial transmitting antenna in an ordering of the transmitting antennas. In one embodiment, selector 412 selects the candidates as the pairings generated in initial block 406. Quadrature-phase distance block 418 determines partial distances for each pairing of a candidate from selector 412 and a quadrature-phase amplitude of the symbols in the constellation. Quadrature-phase distance block 418 determines the partial distances from the partial distances of the candidates from selector 412, and from the decomposed channel matrix 402 and the signals 404 received at the receiving antennas. Quadrature-phase distance block 418 includes respective subblocks 420 through 422 for the candidates from selector 412. Each of the subblocks 420 through 422 determines partial distances for each pairing of the candidate of the subblock with the quadrature-phase amplitudes of the symbols in the constellation.

Selector 424 selects candidates having smaller partial distances from the pairings from quadrature-phase distance block 418. Selector 424 includes subblocks 426 and 428. Subblock 426 selects one candidate from the pairings received from subblock 420 of quadrature-phase distance block 418, and subblock 428 similarly selects one candidate from the pairings received from subblock 422 of quadrature-phase distance block 418.

In-phase distance block 430 determines partial distances for each pairing of a candidate from selector 424 and an in-phase amplitude of the symbols in the constellation. In-phase distance block 430 determines the partial distances from the partial distances of the candidates from selector 424, and from the decomposed channel matrix 402 and the signals 404 received at the receiving antennas. In-phase distance block 430 includes respective subblocks 432 through 434, with subblock 432 receiving the candidates from subblock 426 of selector 424 and subblock 434 receiving the candidates from subblock 428 of selector 424. Each of the subblocks 432 through 434 determines partial distances for each pairing of the candidate of the subblock with the in-phase amplitudes of the symbols in the constellation.

Blocks 436, 438, 440, and 442 similarly determine partial distances of pairings and select candidates from the pairing for a last transmitting antenna in the ordering of the transmitting antennas.

Identifier circuit 444 selects a final candidate having a smallest partial distance among the pairings from in-phase distance block 442. The selected in-phase and quadrature-phase amplitudes of the final candidate determine the symbols detected as transmitted from the transmitting antennas.

Figure 5:
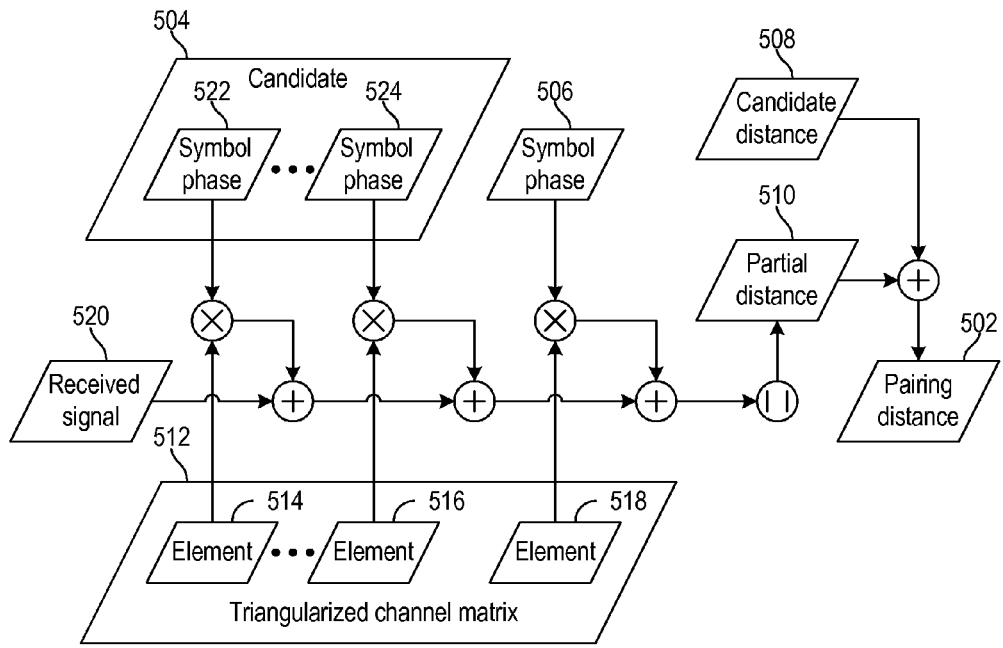
FIG. 5 is a block diagram of a circuit for determining a partial distance for a pairing of a candidate with a phase amplitude in accordance with various embodiments of the invention.

FIG. 5 is a block diagram of a circuit for determining a partial distance 502 for a pairing of a candidate 504 with a phase amplitude 506 in accordance with various embodiments of the invention. A partial distance is similarly determined for the pairing of a candidate 504 with the in-phase or quadrature-phase amplitudes of the symbols in a constellation. For clarity, FIG. 5 shows the calculation of the pairing distance 502 for only one phase amplitude 506 of one symbol in the constellation. The partial distance 502 for the pairing is a sum of a previously determined partial distance 508 for the candidate 504 and a partial distance 510 for the pairing of the candidate 504 and the phase amplitude 506.

The channel matrix is transformed into a triangular matrix 512 with a row of elements 514 through 516 and 518 for a corresponding transmitting antenna. During the transformation of the channel matrix into a triangular matrix, the received signals are correspondingly transformed into the received signal 520. The partial distance 510 is a norm of a sum of the transformed received signal 520 and a weighted sum of the phase amplitudes 522 through 524 and 506. The phase amplitudes 522 through 524 from candidate 504 and the phase amplitude 506 have weights given by the row of elements 514 through 516 and 518 in the triangular matrix 512.

Figure 6:
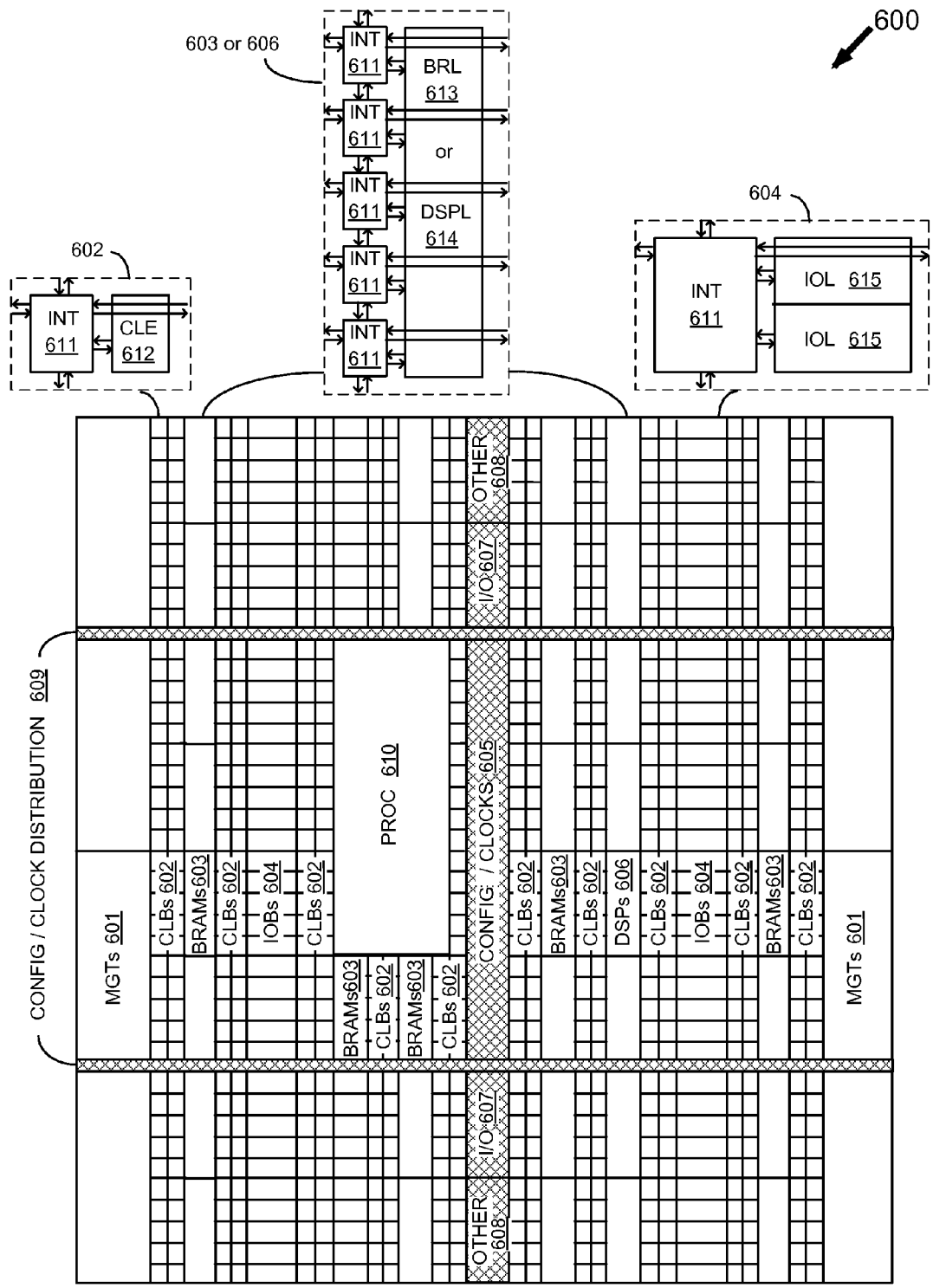
FIG. 6 is a block diagram of a programmable integrated circuit for implementing communication detection in accordance with one or more embodiments of the invention.

FIG. 6 is a block diagram of a programmable integrated circuit for implementing communication detection in accordance with one or more embodiments of the invention. The exemplary illustrated circuit is a programmable logic device (PLD), specifically a Field Programmable Gate Array (FPGA). It will be clear to those of skill in the art, however, that the methods of the invention can be practiced using other types of integrated circuits and/or systems. For example, some embodiments of the invention may utilize Application Specific Integrated Circuits (ASICs), non-programmable integrated circuits, partially programmable integrated circuits, and/or electronic systems other than integrated circuits. It will be clear to those of skill in the art that the invention can be implemented within these and other architectural variations.

Advanced programmable logic devices can include several different types of programmable logic blocks in the array. For example, FIG. 6 illustrates an FPGA architecture 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 612) that can be programmed to implement user logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 7:
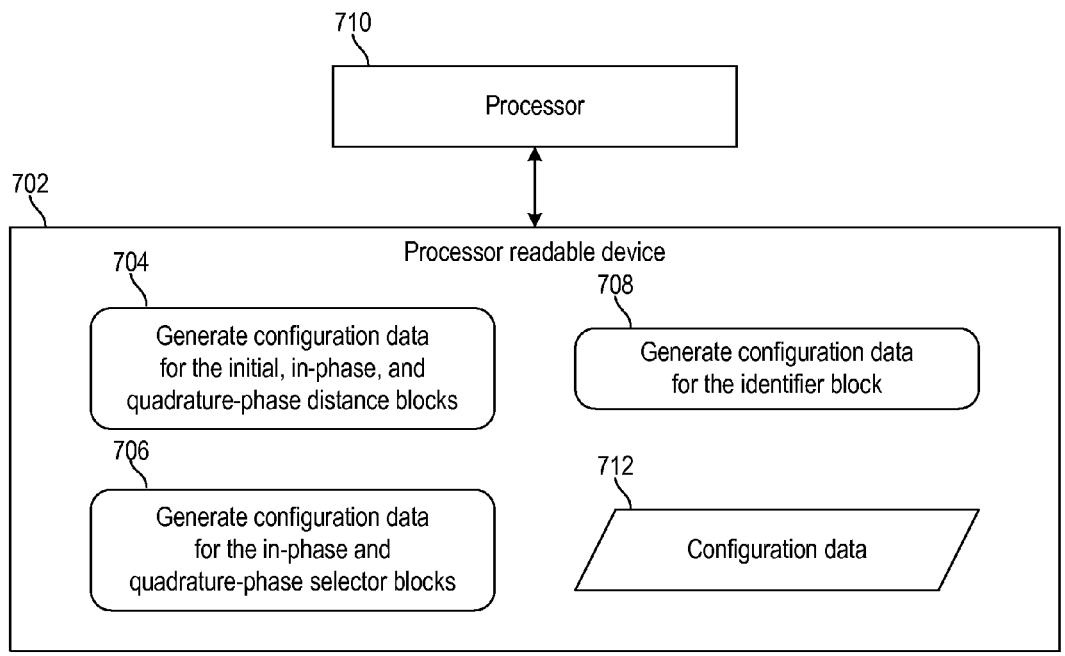
FIG. 7 is a block diagram of a system for generating configuration data for implementing communication detection in a programmable integrated circuit in accordance with one or more embodiments of the invention.

FIG. 7 is a block diagram of a system for generating configuration data for implementing communication detection in a programmable integrated circuit in accordance with one or more embodiments of the invention. Processor-readable device 702 is configured with software modules 704, 706, and 708. Execution of the instructions of software modules 704, 706, and 708 by processor 710 causes processor 710 to generate configuration data that implements MIMO symbol detection in a programmable integrated circuit. In one embodiment, the generated configuration data 712 is stored on the processor readable device 702.

Execution of the instructions of software module 704 causes processor 710 to generate configuration data for in-phase and quadrature-phase distance blocks, including the in-phase and quadrature-phase distance blocks of an initial distance block. Execution of the instructions of software module 706 causes processor 710 to generate configuration data for in-phase and quadrature-phase selectors. Execution of the instructions of software module 708 causes processor 710 to generate configuration data for the identifier block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for detecting symbols transmitted from multiple transmitting antennas and received at multiple receiving antennas. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for detecting communications from multiple transmitting antennas to multiple receiving antennas, wherein an ordering of the transmitting antennas begins with an initial transmitting antenna and ends with a last transmitting antenna, and the ordering includes at least one non-initial transmitting antenna other than the initial transmitting antenna, the circuit comprising:
    for the initial transmitting antenna, first means for determining partial distances for a first plurality of pairings of a null candidate and one of a plurality of combinations of a plurality of quadrature-phase values and a plurality of in-phase values;
    for each non-initial transmitting antenna, second means for determining partial distances for a second plurality of all pairings of one of a first plurality of candidates and one of the quadrature-phase values of a constellation, the second plurality of pairings including a respective set for each first candidate that includes the second pairings of the first candidate and each quadrature-phase value, and a first one of the second means for determining coupled to the first means for determining;
    for each non-initial transmitting antenna, third means for determining partial distances for a third plurality of all pairings of one of a second plurality of candidates and one of the in-phase values of the constellation;
    for each non-initial transmitting antenna, first means for selecting the first plurality of candidates from the first and third pluralities of pairings for a preceding transmitting antenna in the ordering, a first one of the first means for selecting coupled to the first means for determining and to the first one of the second means for determining;
    for each non-initial transmitting antenna, second means for selecting the second plurality of candidates from the second plurality of pairings of the non-initial transmitting antenna, wherein, for each first candidate of the non-initial transmitting antenna, one of the second plurality of candidates is selected to be one of the second pairings that has the partial distance that is smaller in the respective set for the first candidate, and a first one of the second means for selecting coupled to the first one of the second means for determining and to a first one of the third means for determining, a last one of the second means for selecting coupled to a last one of the second means for determining and to a last one of the third means for determining, and a last one of the first means for selecting coupled to a previous one of the third means for determining and to the last one of the second means for determining; and
    third means, coupled to a last one of the third means for determining, for selecting a final candidate from the third plurality of pairings of the last transmitting antenna, wherein the final candidate is the pairing in the third plurality having the partial distance that is smaller.

2. A circuit for detecting communications from multiple transmitting antennas to multiple receiving antennas, wherein the transmitting antennas include first and last transmitting antennas, the circuit comprising:
    a respective first block corresponding to each transmitting antenna other than the first antenna, the respective first block determining partial distances for all first pairings of one of a first plurality of candidates and one of a plurality of quadrature-phase values of a constellation, the first pairings including a respective set for each first candidate that includes the first pairings of the first candidate and each quadrature-phase value;
    a plurality of respective second blocks corresponding to the transmitting antennas, wherein the second block for the first transmitting antenna determines partial distances for all second pairings of a null second candidate and one of a plurality of combinations of one of the quadrature-phase values and one of a plurality of in-phase values, and the respective second block for each transmitting antenna other than the first antenna determines partial distances for all second pairings of one of a second plurality of candidates and one of the in-phase values of the constellation;
    a respective first selector corresponding to each transmitting antenna other than the first antenna and coupled between the respective second block for another of the transmitting antennas and the respective first block for the transmitting antenna, wherein the respective first selector selects the first plurality of candidates for the respective first block from the second pairings for the respective second block;
    a respective second selector corresponding to each transmitting antenna other than the first antenna and coupled between the respective first and the respective second blocks for the transmitting antenna, wherein the respective second selector selects the second plurality of candidates for the respective second block from the first pairings for the respective first block, and for each first candidate, the respective second selector selects one of the second plurality of candidates that is one of the first pairings that has the partial distance that is smallest in the respective set for the first candidate; and
    an identifier circuit coupled to the second block for the last transmitting antenna, wherein the identifier circuit selects a final candidate from the second pairings of the second block, and the final candidate is one of the second pairings having the partial distance that is smallest.

3. The circuit of claim 2, wherein a plurality of symbols in the constellation are the symbols in a quadrature amplitude modulation (QAM) constellation.

4. The circuit of claim 2, wherein the constellation includes one of a plurality of symbols for each of the combinations of one of the quadrature-phase values and one of the in-phase values.

5. The circuit of claim 2, wherein a plurality of symbols in the constellation are specified by the quadrature-phase values and the in-phase values.

6. The circuit of claim 2, wherein the second block for the first transmitting antenna includes a first and second subblock, the first subblock determining respective additional partial distances for the quadrature-phase values, and the second subblock determining the partial distance of each of the second pairings of the null second candidate with one of the combinations from the respective additional partial distance for the quadrature-phase value of the one of the combinations and the in-phase value of the one of the combinations.

7. The circuit of claim 2, wherein the respective first selector corresponding to one of the transmitting antennas receives the partial distances for the second pairings of the null second candidate with the combinations, and the respective first selector selects the first plurality of candidates as the second pairings.

8. The circuit of claim 2, wherein the respective first block for each transmitting antenna other than the first antenna determines the partial distances in response to a plurality of signals received at the receiving antennas, and the respective second block for each transmitting antenna determines the partial distances in response to the signals.

9. The circuit of claim 2, wherein the respective first block for each transmitting antenna other than the first antenna determines the partial distances in response to a channel matrix for the transmitting and receiving antennas, and the respective second block for each transmitting antenna determines the partial distances in response to the channel matrix.

10. The circuit of claim 2, wherein the respective first block for each transmitting antenna other than the first antenna determines the partial distance for each first pairing of one of the first plurality of candidates and one of the quadrature-phase values, the partial distance being a sum of a partial distance of the candidate and a partial distance calculated as a function of the quadrature-phase value and the quadrature-phase and in-phase values recursively included in the candidate, and the respective second block for each transmitting antenna determines the partial distance for each second pairing of one of the second plurality of candidates and one of the in-phase values, the partial distance being a sum of a partial distance of the candidate and a partial distance calculated as a function of the in-phase value and the quadrature-phase and in-phase values recursively included in the candidate.

11. The circuit of claim 2, wherein the respective first block for each transmitting antenna other than the first antenna includes a respective first subblock for each first one of a predetermined number of the candidates in the first plurality, and the respective second block for each transmitting antenna other than the first antenna includes a respective second subblock for each second one of a predetermined number of the candidates in the second plurality.

12. The circuit of claim 11, wherein the respective first subblock for each first candidate determines the partial distances for the first pairings in the respective set for the first candidate, the first pairings in the respective set for the first candidate being the first pairings of the first candidate and each quadrature-phase value, and the respective second subblock for each second candidate determines the partial distances for the second pairings of the second candidate and each in-phase value.

13. The circuit of claim 12, wherein the respective first selector for at least one of the transmitting antennas includes a respective third subblock for each first candidate of the predetermined number of the candidates in the first plurality, the respective third subblock coupled to the respective first subblock for the first candidate, and the respective second selector for each transmitting antenna other than the first antenna includes a respective fourth subblock for each second candidate of the predetermined number of the candidates in the second plurality, the respective fourth subblock coupled to the respective second subblock for the second candidate and coupled to the respective first subblock for a first candidate of the predetermined number of the candidates in the first plurality.

14. The circuit of claim 13, wherein, for each first candidate, the respective third subblock selects the first candidate, and, for each second candidate, the respective fourth subblock coupled to the respective first subblock for a first candidate selects the second candidate that is the first pairing having the partial distance that is smallest in the respective set for the first candidate.

15. The circuit of claim 2, wherein the respective first selector for at least one of the transmitting antennas includes a respective first subblock for each first one of a predetermined number of the candidates in the first plurality, and the respective second selector for each transmitting antenna other than the first antenna includes a respective second subblock for each second one of a predetermined number of the candidates in the second plurality.

16. The circuit of claim 15, wherein the respective first subblock selects the first candidate, and the respective second subblock selects the second candidate that is the first pairing having the partial distance that is smallest in the respective set for a first candidate of the predetermined number of the candidates in the first plurality.

17. The circuit of claim 2, wherein the respective first selector for each transmitting antenna other than the first antenna selects a predetermined number of the candidates in the first plurality, and the respective second selector for each transmitting antenna other than the first antenna selects a predetermined number of the candidates in the second plurality.

18. The circuit of claim 2, wherein the identifier circuit selects the final candidate that recursively includes, for each transmitting antenna, a respective one of a plurality of symbols in the constellation, and, for each transmitting antenna, the respective symbol is detected as transmitted from the transmitting antenna.

19. A non-transitory program storage medium, comprising:
a processor-readable storage device configured with instructions for detecting communications from multiple transmitting antennas to multiple receiving antennas, the transmitting antennas including first and last transmitting antennas, wherein execution of the instructions by one or more processors causes the one or more processors to perform operations including generating and storing configuration data for a programmable integrated circuit that implements,
a respective first block corresponding to each transmitting antenna other than the first antenna, the respective first block determining partial distances for all first pairings of one of a first plurality of candidates and one of a plurality of quadrature-phase values of the constellation, the first pairings including a respective set for each first candidate that includes the first pairings of the first candidate and each quadrature-phase value;
a plurality of respective second blocks corresponding to the transmitting antennas, wherein the second block for the first transmitting antenna determines partial distances for all second pairings of a null second candidate and one of a plurality of combinations of one of the quadrature-phase values and one of a plurality of in-phase values, and the respective second block for each transmitting antenna other than the first antenna determines partial distances for all second pairings of one of a second plurality of candidates and one of the in-phase values of the constellation;
a respective first selector corresponding to each transmitting antenna other than the first antenna and coupled between the respective second block for another of the transmitting antennas and the respective first block for the transmitting antenna, wherein the respective first selector selects the first plurality of candidates for the respective first block from the second pairings for the respective second block;

a respective second selector corresponding to each transmitting antenna other than the first antenna and coupled between the respective first and the respective second blocks for the transmitting antenna, wherein the respective second selector selects the second plurality of candidates for the respective second block from the first pairings for the respective first block, and for each first candidate, the respective second selectors selects one of the second plurality of candidates that is one of the first pairings that has the partial distance that is smallest in the respective set for the first candidate; and an identifier circuit coupled to the second block for the last transmitting antenna, wherein the identifier circuit selects a final candidate from the second pairings of the second block, and the final candidate is one of the second pairings having the partial distance that is smallest.

* * * * *